United States Patent Office 2,863,754
Patented Dec. 9, 1958

2,863,754

METHOD OF WEED CONTROL

Ralph Louis Wain, near Ashford, England, assignor to National Research Development Corporation, London, England, a British company No Drawing. Application April 22, 1955
Serial No. 503,322

Claims priority, application Great Britain July 6, 1954

10 Claims. (Cl. 71—2.6)

This invention relates to new methods of weed control utilising selective herbicidal compositions.

Prior to the advent of the so-called "hormone" or "systemic" herbicides, the most effective methods of selective weed control, i. e. destruction or prevention of growth of weeds in areas sown, or to be sown, with useful crops, were dependent upon differences in morphology and habit of growth between crop and weed and utilised such contact herbicides as sulphuric acid, dinitro-compounds and copper salts. Of recent years, the use for various applications of the contact type of herbicide has largely given way to the use of the "hormone" or "systemic" type compounds which, in the case of some plants, stimulate or modify plant growth when applied up to a certain concentration and act to retard or finally to kill the plant when applied at higher concentration. The efficiency of the latter type compounds depends upon a "physiological" resistance to these compounds of certain families of plants, particularly monocotyledons, as compared to dicotyledons.

At the present time "hormone" type herbicides are widely used with highly succesful results in agriculture for selective weed control in useful crops. Thus, for example, they can be used to control such weeds as charlock in a field of growing cereal. The most widely known class of hormone-type herbicides consists of certain aryloxy-aliphatic acids and derivatives such as salts, esters and amides, see, for example, the Jones Patents Nos. 2,390,941, 2,396,513 and 2,412,510. Research and experimentation have shown that only certain—indeed but relatively few—aryloxy-aliphatic acids and their derivatives exhibit activity as selective heribicides. Thus, for example, phenoxyacetic acid and its 2:6-dichloro-, 3:5-dichloro- and 2:4:6-trichloro derivatives are quite inactive whereas 2:4-dichlorophenoxyacetic acid (2:4–D) and the corresponding 2:4:5-trichloro- compound have met with very considerable success (as also has 2-methyl-4-chlorophenoxyacetic acid) in weed control. As regards the higher members of the homologous series of which these active acetic acid derivatives are respectively the lowest members, it is now generally accepted that they are inactive per se but can be converted by $\beta$-oxidation in the plant either to the active acetic acid homologue or in other cases to an inactive metabolic product. In any event an alternation in growth-regulating activity has been demonstrated to occur with increasing length of side-chain. Thus, Synerholm and Zimmerman (Contributions of the Boyce Thompson Institute 14, (7): 369–382, 1947) have reported on an investigation of a number of aryloxy-aliphatic acids as possible plant-growth regulants, concluding in the case of the $\omega$-(2:4-dichlorophenoxy)alipha-tic acid series that they are physiologically active or inactive depending upon whether they contain respectively an even or odd number of carbon atoms in the aliphatic acid portion of the molecule. While pointing out that it is impossible to extend the generalisation to include all growth regulators of the aryloxy-aliphatic acid type, they further observed inactivity in the chlorophenoxy-butyric acid series. More specifically, they noted, on the basis of experiments with tomato plants, that $\gamma$-(2:4:5-trichlorophenoxy)-butyric acid appears to be inactive even at 100 mg./g. in lanolin despite the fact that the acetic acid homologue of this compound is a very active growth regulator. Whether on account of the wide acceptance of the aforesaid theory or whether on the basis of the undeniable fact that the active acetic acid derivatives have one advantage or another over higher homologues, there is no doubt that throughout the world but a very few aryloxy-aliphatic compounds are used on any substantial scale as selective herbicides and all of them belong to the acetic acid or alkyl-substituted acetic acid series.

The importance of the known hormone-type herbicides is illustrated by the fact that at the present time over 100,000,000 acres of the world's surface are sprayed annually for weed control. They have by now been used for a sufficiently long time and under such varied circumstances as to bring out their inherent limitations, more especially the selectivity spectrum is not as wide as required and there are many important plants which are damaged or destroyed by them to the same or, in some cases, to a greater degree or with a greater speed than the neighbouring weeds to be eradicated. Indeed, in general, it can be said that none of the herbicides heretofore known offers a satisfactory answer to the problem of weed control in broad-leafed plants at the concentrations customarily used.

The primary object of the invention is to provide methods for eradicating weeds in areas sown with useful broad-leaf crops which cannot satisfactorily and economically be treated with herbicidal compositions hitherto known.

Research and experimentation on selective weed control conducted by and under the direction of the present applicant over the past few years has resulted in the discovery that, in addition to the factors on which the use of firstly the so-called contact-type and secondly the so-called hormone-type of herbicides has been based, there is a further relevant factor constituting a new and fundamental principle upon which selective weed control may operate. It has thus been discovered that specific $\beta$-oxidase enzyme systems may be present in the tissues of different plant species and that there may be a definite relationship between the enzyme make-up of a particular plant tissue and the chemical character of, including more particularly the nature and position of nuclear substituents in, an $\omega$-aryloxyalkane-carboxylic acid type hormone herbicide derived from straight chain aliphatic acids higher in the series than acetic acid such that in respect of that particular plant a specific type of herbicidal agent can be provided which, due to the enzyme system specific to the plant species in question, is not degraded in that plant to the active acetic derivative, but which is nevertheless so degraded within the tissues of many common weeds of the type normally to be found in association with the plant species in question.

According to the present invention weed control in important varieties of leguminous fodder crops of the genera Trifolium and Medicago such as clover and lucerne (alfalfa) and, but with less importance, in parsnip and celery can satisfactorily be achieved by treating the crop area with a member of the class consisting of $\gamma$-(2:4-dichlorophenoxy)-butyric acid, the corresponding caproic acid and certain derivatives of these acids in herbicidal concentrations. That these compounds are effective for this purpose is highly surprising for on the basis of known facts and generally accepted theory one would expect them to behave in precisely the same way, i. e. to have the same plant regulant properties, as 2:4-D and its derivatives. Thus, the said compounds possess no appreciable growth regulating activity with respect to such crop plants of economic importance as clover, celery, parsnip and pea, all of which can be severely affected by 2:4-dichlorophenoxy-, 3:4-dichlorophenoxy- and 2-methyl-4-chlorophenoxy-acetic acids and other such known hormone-type herbicides when applied at the same concentration. At the same time, these compounds will control a range of important weeds such as charlock, fumitory, fat-hen, creeping thistle and annual nettle as conventional concentrations.

This, as it were, super-selective action arising from selective chemical modification within plant tissue is highly specific. Thus, it is not possessed by the corresponding α-substituted acids which are in fact similar in properties to the corresponding chlorophenoxyacetic acids.

The efficacy of the method of the invention has been clearly demonstrated not merely by greenhouse and laboratory experiments but also in scientifically controlled field trials and is of very great economic importance. Thus, it is estimated that the area sown with clover as a useful crop in the United States per annum amounts to some 40,000,000 acres and there is at the present time no satisfactory herbicide available for eradicating weeds in such crops without at the same time damaging the crop itself. A great many field experiments have been carried out by various workers on the use of 2:4-dichlorophenoxyacetic acid (2:4-D) and 2-methyl-4-chlorophenoxyacetic acid (M. C. P. A.) to discover at what rates these two commonly used herbicides might safely be used on grassland and cereals when clover is present. The results, however, are not very satisfactory even using applications as low as a few ounces per acre which have been recommended when, as will be evident, a much lower efficiency in weed destruction is obtained. A similar problem exists in the case of lucerne.

The utility of the method of the invention will be apparent from the following comparative test results, in which for the sake of brevity 2:4-dichlorophenoxyacetic, butyric and caproic acids are referred to as 2:4-D, 2:4-DB and 2:4-DC respectively.

*(a) Pot experiments*

Seedlings of the following crops and weeds were sprayed to run off with aqueous solutions containing 0.1% of the respective sodium salts together with 0.2% wetting agent of the sodium secondary alcohol sulphate type. Observations were recorded as follows after 4 weeks.

| Species | 2:4-DB | 2:4-D | 2:4-DC |
|---|---|---|---|
| Weeds: | | | |
| Annual nettle (*Urtica urens*) | Dead | Dead | Dead. |
| Fat hen (*Chenopodium album*) | ____do____ | ____do____ | |
| Knot grass (*Polygonum aviculare*) | ____do____ | ____do____ | |
| Fumitory (*Fumaria officinalis*) | ____do____ | ____do____ | |
| Sow thistle (*Sonchus oleraceus*) | Severely damaged | ____do____ | |
| Creeping thistle (*Cirsium arvense*) | Dead | ____do____ | Do. |
| Crops: | | | |
| White clover (*Trifolium repens*) | No effect | Severely damaged | No effect. |
| Red clover (*Trifolium pratense*) | Slight effect | Dead | Do. |
| Celery (*Apium graveolens*) | No effect | ____do____ | Do. |
| Lucerne (*Medicago sativa*) | Slight effect | Dead | |
| Parsnip (*Pastinaca sativa*) | Very slight effect | ____do____ | |

*(b) Control of weeds in field experiments with 2:4-DB*

(1) 2:4-DB applied at the following rates per acre as a solution of its diethanolamine salt gave the results shown below:

| Weed | Height at spraying, inches | Percent Control (dose rate in lbs. per acre) | | |
|---|---|---|---|---|
| | | ½ | 1 | 2 |
| Creeping thistle | 15-18 | 72 | 88 | 83 |
| Knot grass | 3 | 68 | 91 | 94 |
| Fat hen | 2 | 86 | 100 | 100 |
| Sow thistle (perennial) | 6 | 100 | 100 | 100 |

(2) 2:4-DB as its ethyl ester was applied to field plots as an emulsion made up from a self-emulsifying concentrate in mineral oil containing 40% w./v. acid equivalent. Results:

| Weed | Height at spraying, inches | Percent Control (dose rate in lbs. per acre) | | |
|---|---|---|---|---|
| | | ½ | 1 | 2 |
| Creeping thistle | 6 | 49 | 86 | 90 |
| Charlock | 4 | 82 | 100 | 100 |
| Fat hen | 4 | 38 | 100 | 100 |
| Knot grass | 2 | 79 | 100 | 100 |
| Sow thistle (perennial) | 6 | 100 | 93 | 100 |

In the method of the invention there may be used not only the stated acids but also their salts with inorganic and organic bases, of which examples are the sodium, potassium, ammonium, alkylamine and alkanolamine (including ethanolamine) salts, their esters, of which examples are the methyl and ethyl esters, and their amides and nitriles. The selected compounds may be employed in any of the physical forms in which plant-growth regulants or herbicides of the 2:4-D type are customarily used; in all cases in association with an inert diluent. In the case of water-soluble compounds, e. g. the alkali metal salts, it is convenient to employ an aqueous solution where application in liquid form is desired. Alternatively, they may be used as solid compositions in conjunction, therefore, with solid diluents such as talc, clay or other such inert material. In the case of compounds insoluble or but sparingly soluble in water, it is convenient to employ them in the form of an aqueous emulsion incorporating a wetting, dispersing or emulsifying agent of the ionic or non-ionic type, the latter being preferred since they are not affected by electrolytes. The latter type of formulation is preferably made up as a self-emulsifying concentrate containing the active substance dissolved in the dispersing agent or in a solvent compatible with that dispersing agent, the composition being made ready for use by the simple addition of water. Specific compositions include aqueous solutions of water-soluble salts which may contain a wetting agent, wettable powders containing therefore acid or amide in association with diluent powder and wetting agent, oil emulsions containing one or more of the esters and micronised oil suspensions of either acid.

For the purpose of the invention, the aforesaid herbicidal compounds will be used in a concentration of at least 0.05% by weight, the balance consisting of a vehicle, fillers, etc. The optimum concentration will naturally vary according to the crop to be treated but in general concentrations ranging between 1 to 2 lbs. per acre will be entirely satisfactory.

The following are illustrative examples of effective herbicidal compositions for use in the method of the invention.

EXAMPLE I

Parts

Sodium γ-(2:4-dichlorophenoxy)-butyrate (acid dissolved in theoretical quantity of caustic soda) _____ 43.5
Ethylene di-amine tetra-acetic acid _____ 0.2
Sodium hydroxide _____ 0.5
Water to 100 parts by volume.

The foregoing constitutes a stock concentrate one part by volume of which can be added to 29 parts by volume of water for application at the rate of 15 gallons per acre.

EXAMPLE II

In the concentrate of Example I the said sodium salt was replaced by 46.5 parts of the corresponding potassium salt.

EXAMPLE III

A concentrate as described in Example I was made up using 43 parts of ammonium ω-(2:4-dichlorophenoxy)caproate in place of the said sodium salt.

EXAMPLE IV

To any of the formulations of Examples I to III 2.0 parts by weight of sodium lauryl sulphate may be added.

EXAMPLE V 40 parts by weight of γ-(2:4-dichlorophenoxy)butyric acid was warmed with 25 parts by weight of diethanolamine until the acid had dissolved. Water was added to give 100 parts by volume.

One part by volume of this concentrate could be diluted with 14 parts by volume of water for application at the rate of 15 gallons per acre.

EXAMPLE VI

In a formulation of the type described in Example V 20 parts of diethylamine were substituted for the diethanolamine.

EXAMPLE VII

In formulations as described in Examples V and VI, a quantity of "Texafor" F, a non-ionic wetting agent of the alkyl phenol-ethylene oxide type, may be incorporated.

The next following examples illustrate ester formulations made up as emulsions. These are usually prepared in the form of self-emulsifying concentrates in which the ester and the emulsifying agent is dissolved in a large bulk of a solvent (usually a mineral oil or an aromatic solvent such as xylene) or in which the emulsifying agent is dissolved in the ester with the possible addition of a small bulk of a co-solvent.

EXAMPLE VIII

| | Parts |
|---|---|
| Ethyl γ-(2:4-dichlorophenoxy)butyrate | 44.5 |
| Sodium di-nonyl sulpho-succinate | 3 |
| "Texafor" D40 (a castor-oil polyethylene oxide condensation product) | 11 |
| Shell oil 132 (a light grade mineral oil) to 100 parts by volume. | |

1 part by volume of this concentrate can be mixed with 59 parts by volume of water to form a stable emulsion for application at the rate of 15 gallons per acre.

EXAMPLE IX

In the formulation of Example VIII, 49 parts of ethyl ω-(2:4-dichlorophenoxy)caproate were used in place of the corresponding butyrate.

EXAMPLE X

| | Parts |
|---|---|
| β-Butoxy-ethyl γ-(2:4-dichlorophenoxy)butyrate | 84 |
| Sodium di-nonyl sulpho-succinate | 4 |
| Texafor D40 | 13.5 |
| Xylene | 4 |

1 part by volume of this concentrate can be mixed with 39 parts by volume of water to form a stable emulsion for application at the rate of 10 gallons per acre.

The next following example illustrates the use of aqueous suspensions of water-insoluble compounds (e. g. the acids and their amides). These suspensions contain finely ground active substance in admixture with a wetting agent, with or without an inert carrier material.

EXAMPLE XI

| | Parts |
|---|---|
| γ-(2:4-dichlorophenoxy)butyramide | 40 |
| Calcined silica dust | 40 |
| Sodium lauryl sulphate powder | 20 |

The whole was ground together to produce a powder of mean particle size of about 10 microns.

One part by weight of this dispersible powder may be mixed thoroughly with 200 parts by volume of water and the resulting suspension applied at the rate of 100 gallons per acre.

The following examples illustrate the employment of the compounds of the invention in dry preparations. These may contain the acid, the amide or any salt or ester. In the case of esters, dusts can be formed by spraying a solution of the ester in mineral oil or other solvent onto the inert carrier material with continuous mixing. The others may be incorporated by grinding the constituents together.

EXAMPLE XII

| | Parts |
|---|---|
| n-Butyl-γ-(2:4-dichlorophenoxy)butyrate | 1 |
| Mineral oil 132 | 1 |

This solution was sprayed onto and mixed with 98 parts of finely divided native gypsum. This dust may be applied at the rate of 2 cwts. per acre.

EXAMPLE XIII

| | Parts |
|---|---|
| γ-(2:4-dichlorophenoxy)butyric acid | 2 |
| Native gypsum | 98 |

This dust may be applied at the rate of 2 cwts. per acre.

I claim:
1. A method for eradicating weeds from crop areas containing a growing crop selected from celery, parsnip, pea and leguminous fodder crops of the genera Trifolium and medicago which comprises applying to the crop areas a herbicide of the class consisting of the ω-(2:4-dichlorophenoxy)-butyric and caproic acids, their salts, esters, nitriles and amides, at a rate sufficient to kill the weeds without significant damage to the crop.

2. A method for the eradication of weeds in active state of growth in an area containing clover which comprises applying to the crop area at a rate sufficient to kill the weeds without significant damage to the crop a herbicidal composition containing a compound of the class consisting of the ω-(2:4-dichlorophenoxy)butyric and caproic acids, their salts, esters, nitriles and amides in association with an inert carrier, said compound constituting at least .05% by weight of the composition.

3. A method for the eradication of weeds in active state of growth in an area containing alfalfa which comprises applying to the crop area at a rate sufficient to kill the weeds without significant damage to the crop a herbicidal composition containing a compound of the class consisting of the ω-(2:4-dichlorophenoxy)butyric and caproic acids, their salts, esters, nitriles and amides in association with an inert carrier, said compound constituting at least .05% by weight of the composition.

4. A method for the eradication of weeds in active state of growth in an area containing celery which comprises applying to the crop area at a rate sufficient to kill the weeds without significant damage to the crop a herbicidal composition containing a compound of the class consisting of the ω-(2:4-dichlorophenoxy)butyric and caproic acids, their salts, esters, nitriles and amides in association with an inert carrier, said compound constituting at least .05% by weight of the composition.

5. A method for the eradication of weeds in active state of growth in an area containing parsnip which comprises applying to the crop area at a rate sufficient to kill the weeds without significant damage to the crop a herbicidal composition containing a compound of the class consisting of the ω-(2:4-dichlorophenoxy)butyric and caproic acids, their salts, esters, nitriles and amides in association with an inert carrier, said compound constituting at least .05% by weight of the composition.

6. A method for the control of weeds of the type of charlock, creeping thistle and annual nettle in a lucerne (alfalfa) crop in which a compound of the class consisting of the ω-(2:4-dichlorophenoxy)butyric and caproic acids, their salts, esters, nitriles and amides is applied to the crop area in a concentration ranging between 1 and 2 lbs. per acre.

7. A method for the control of weeds of the type of charlock, creeping thistle and annual nettle in a clover crop in which a compound of the class consisting of the ω-(2:4-dichlorophenoxy)butyric and caproic acids, their salts, esters, nitriles and amides is applied to the crop area in a concentration ranging between 1 and 2 lbs. per acre.

8. A method for the control of weeds of the type of charlock, creeping thistle and annual nettle in grassland containing a clover crop in which a compound of the class consisting of the ω-(2:4-dichlorophenoxy)-butyric and caproic acids, their salts, esters, nitriles and amides is applied to the crop area at a rate sufficient to kill the weeds without significant damage to the crop.

9. A method for the control of weeds of the type of charlock, creeping thistle and annual nettle in an area sown with cereal and with clover in which a compound of the class consisting of the ω-(2:4-dichlorophenoxy)-butyric and caproic acids, their salts, esters, nitriles and amides is applied to the crop area at a rate sufficient to kill the weeds without significant damage to the cereal and to the clover.

10. A method for the eradication of weeds in active state of growth in an area containing pea which comprises applying to the crop area at a rate sufficient to kill the weeds without significant damage to the crop a herbicidal composition containing a compound of the class consisting of the ω-(2:4-dichlorophenoxy)butyric and caproic acids, their salts, esters, nitriles and amides in association with an inert carrier, said compound constituting at least .05% by weight of the composition.

References Cited in the file of this patent

"Contributions from the Boyce Thompson Institute," January-March 1947, pages 369 to 382.

"Botanical Gazette," vol. 107 (1946), pages 480 and 494.